(12) United States Patent
Gibbons et al.

(10) Patent No.: US 8,876,032 B1
(45) Date of Patent: Nov. 4, 2014

(54) WEED BARRIER REMOVAL ASSEMBLY

(76) Inventors: Dustin Gibbons, Brookings, SD (US); William Gibbons, Brookings, SD (US)

( * ) Notice: Subject to any disclaimer, the term of this patent is extended or adjusted under 35 U.S.C. 154(b) by 184 days.

(21) Appl. No.: 13/597,757

(22) Filed: Aug. 29, 2012

(51) Int. Cl.
*B65H 75/40* (2006.01)

(52) U.S. Cl.
USPC .................. 242/403; 242/533.8; 242/557

(58) Field of Classification Search
USPC ............... 242/390.7, 403, 557, 533.8
See application file for complete search history.

(56) References Cited

U.S. PATENT DOCUMENTS

| | | |
|---|---|---|
| 3,632,054 A | 1/1972 | Heppelmann et al. |
| 4,473,196 A | 9/1984 | Sammann et al. |
| 5,388,782 A | 2/1995 | King |
| 5,806,779 A | 9/1998 | Crum |
| 5,895,197 A * | 4/1999 | Mc Vaugh ................ 414/680 |
| 6,543,713 B1 | 4/2003 | Frolander et al. |
| 6,589,007 B2 | 7/2003 | Burton |
| 7,011,270 B1 * | 3/2006 | Chouinard et al. ........ 242/578.2 |
| 7,143,971 B2 | 12/2006 | Yoder et al. |
| 7,762,745 B1 | 7/2010 | Burchland |
| 7,793,881 B1 * | 9/2010 | Torres ................... 242/532.6 |

* cited by examiner

Primary Examiner — Sang Kim

(57) ABSTRACT

A weed barrier removal assembly facilitates removal of weed barrier material. The assembly includes a mounting plate configured for coupling to a motorized vehicle. First and second arms are coupled to and extend from the mounting plate in spaced relationship to each other. A first coupler is rotatably coupled to the first arm and a second coupler is rotatably coupled to the second arm. The first and second couplers are configured for coupling to an elongated member wherein the elongated member extends between the first and second arms. A motivator is operationally coupled to the first coupler wherein the first coupler is selectively rotated by activating the motivator.

11 Claims, 7 Drawing Sheets

WEED BARRIER REMOVAL ASSEMBLY

BACKGROUND OF THE DISCLOSURE

Field of the Disclosure

The disclosure relates to winding devices and more particularly pertains to a new winding device for facilitating removal of weed barrier material.

SUMMARY OF THE DISCLOSURE

An embodiment of the disclosure meets the needs presented above by generally comprising a mounting plate configured for coupling to a motorized vehicle. First and second arms are coupled to and extend from the mounting plate in spaced relationship to each other. A first coupler is rotatably coupled to the first arm and a second coupler is rotatably coupled to the second arm. The first and second couplers are configured for coupling to an elongated member wherein the elongated member extends between the first and second arms. A motivator is operationally coupled to the first coupler wherein the first coupler is selectively rotated by activating the motivator.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF THE DRAWINGS

The disclosure will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
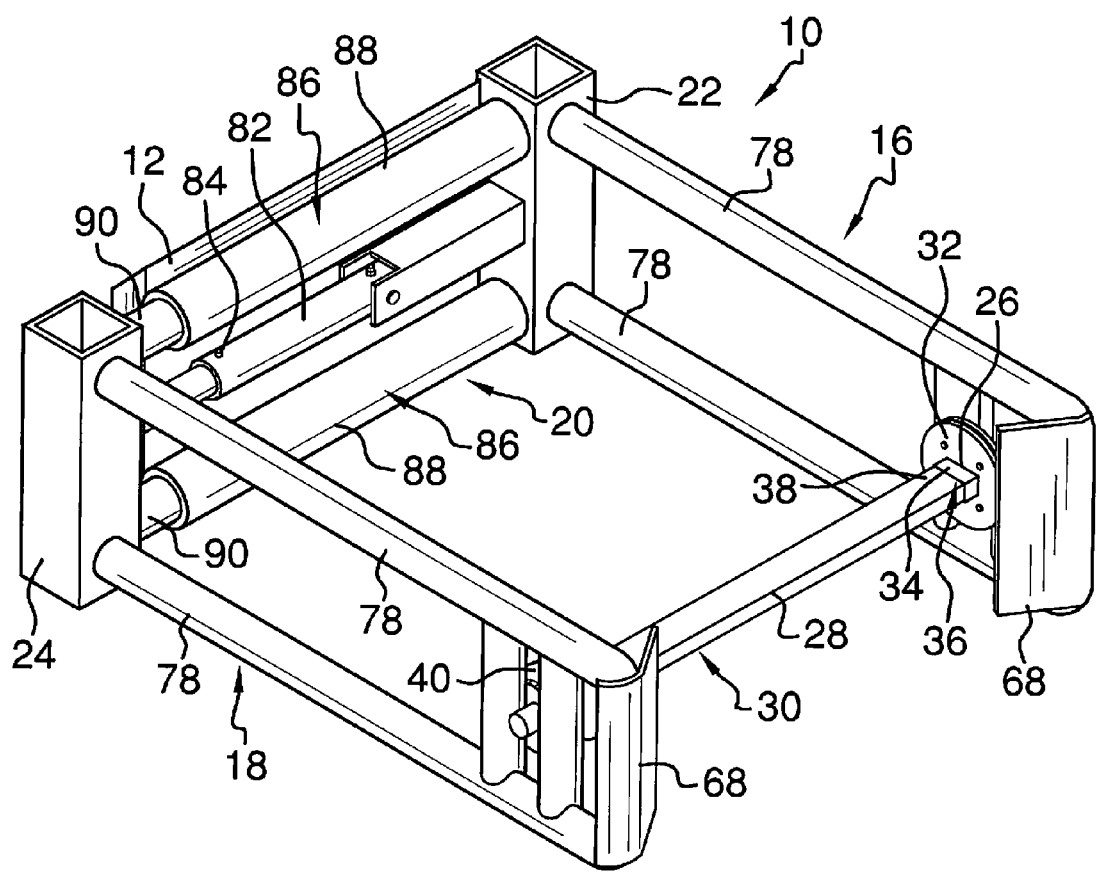
FIG. 1 is a top front side perspective view of a weed barrier removal assembly according to an embodiment of the disclosure.
Figure 2:
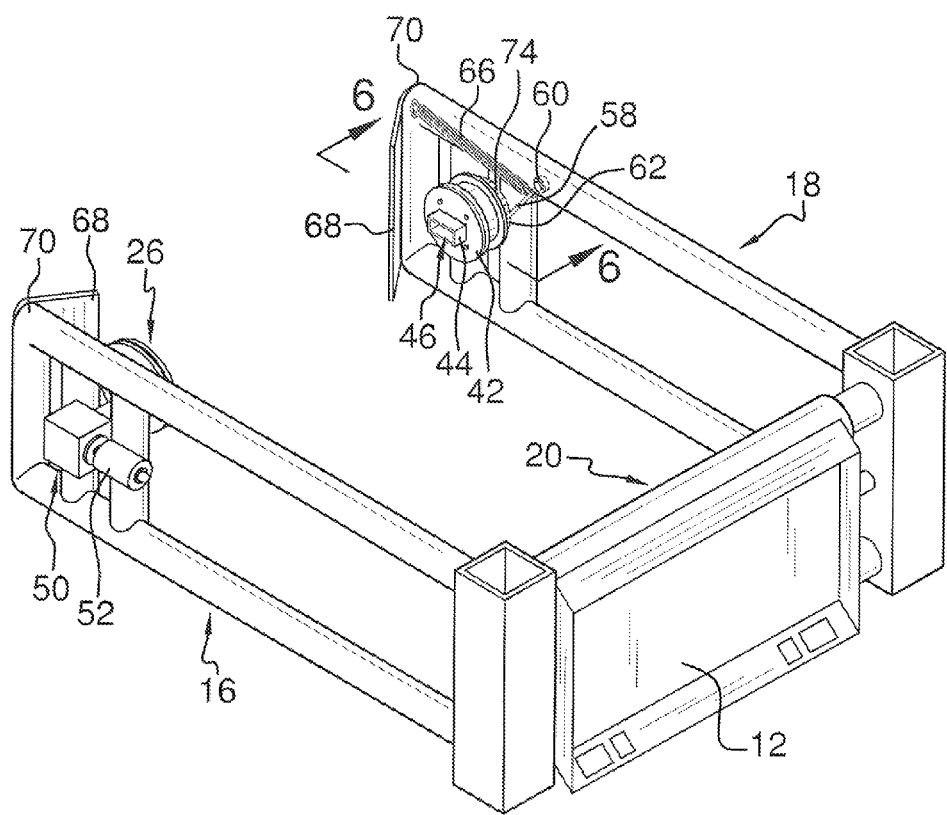
FIG. 2 is a top back side perspective view of an embodiment of the disclosure.
Figure 3:
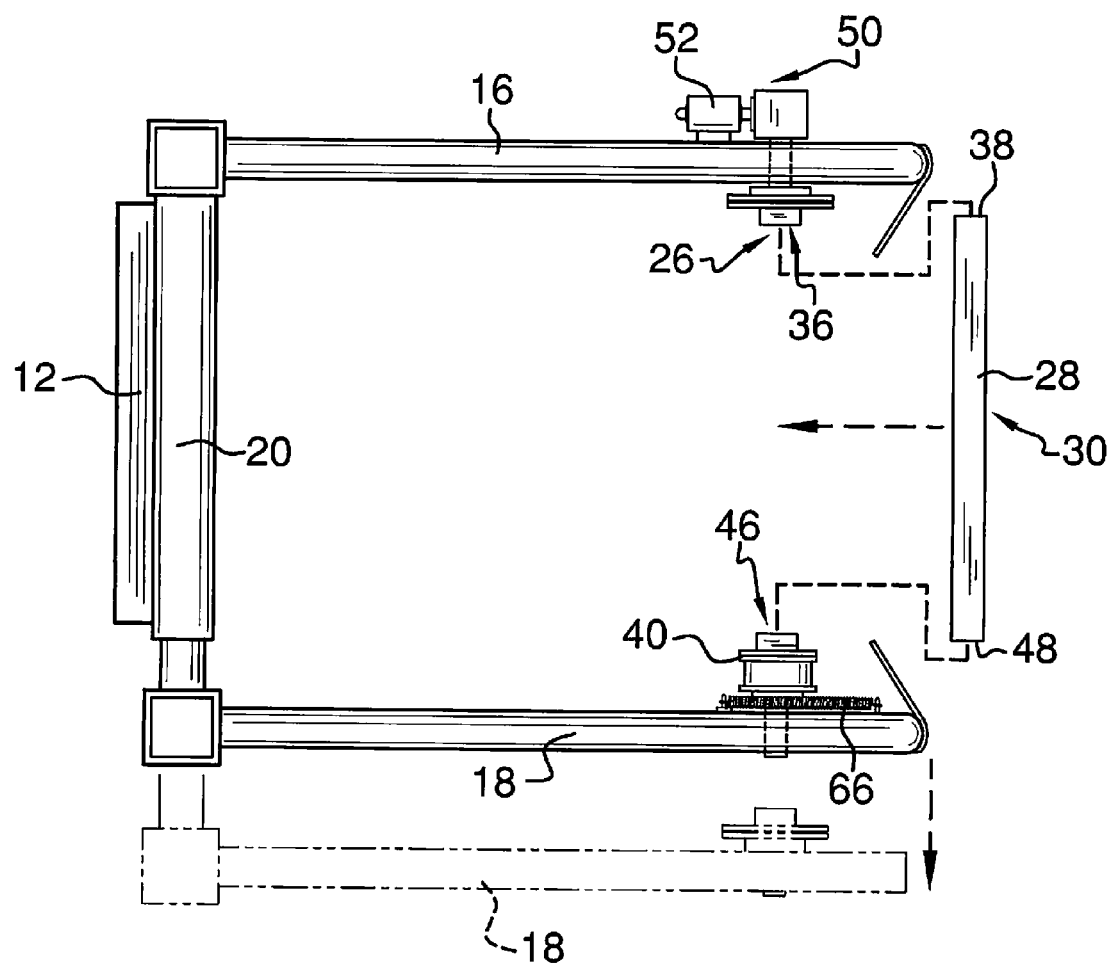
FIG. 3 is a top view of an embodiment of the disclosure.
Figure 4:
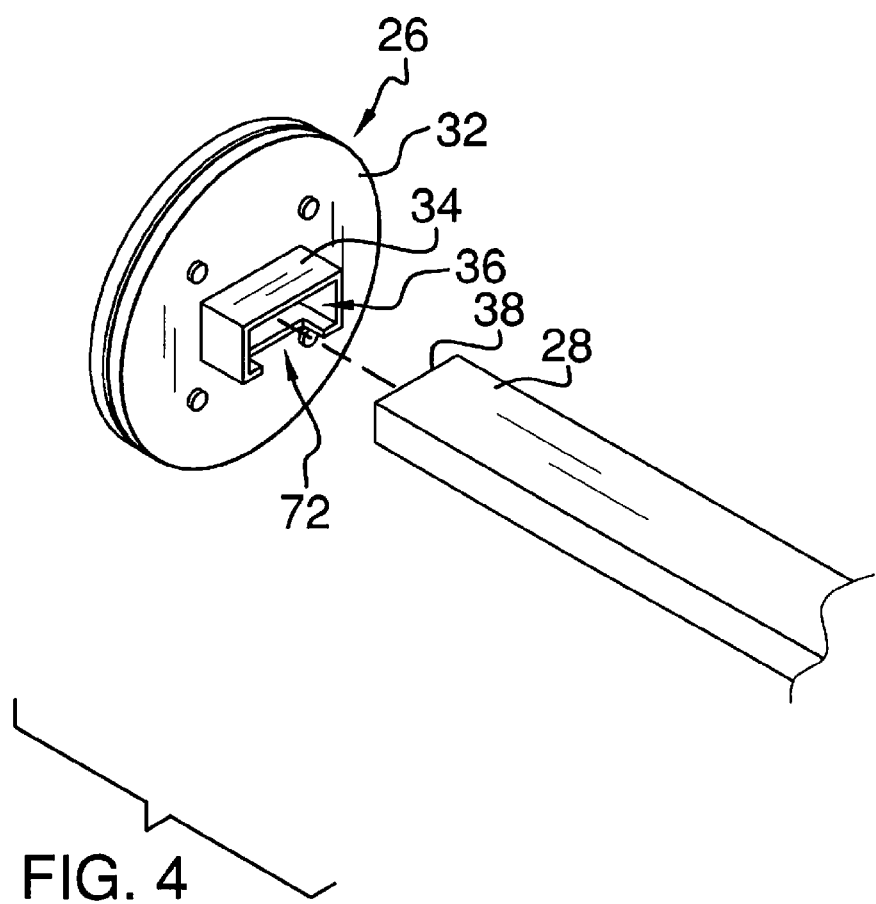
FIG. 4 is a top front side perspective view of an embodiment of the disclosure.
Figure 5:
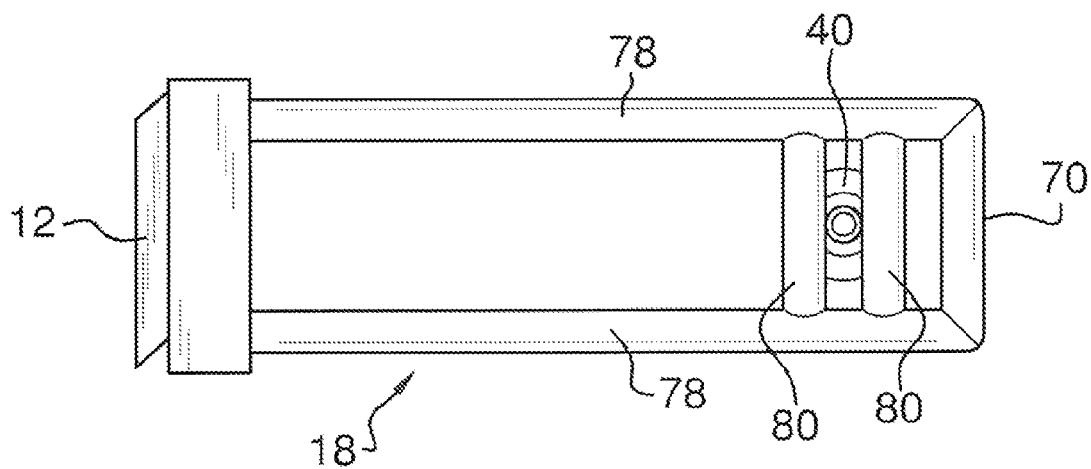
FIG. 5 is a side view of an embodiment of the disclosure.
Figure 6:
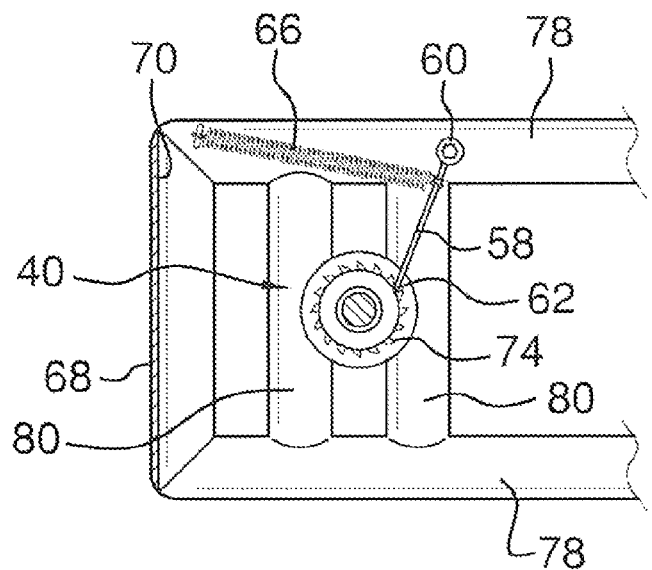
FIG. 6 is a cross-sectional view of an embodiment of the disclosure taken along line 6-6 of FIG. 2.
Figure 7:
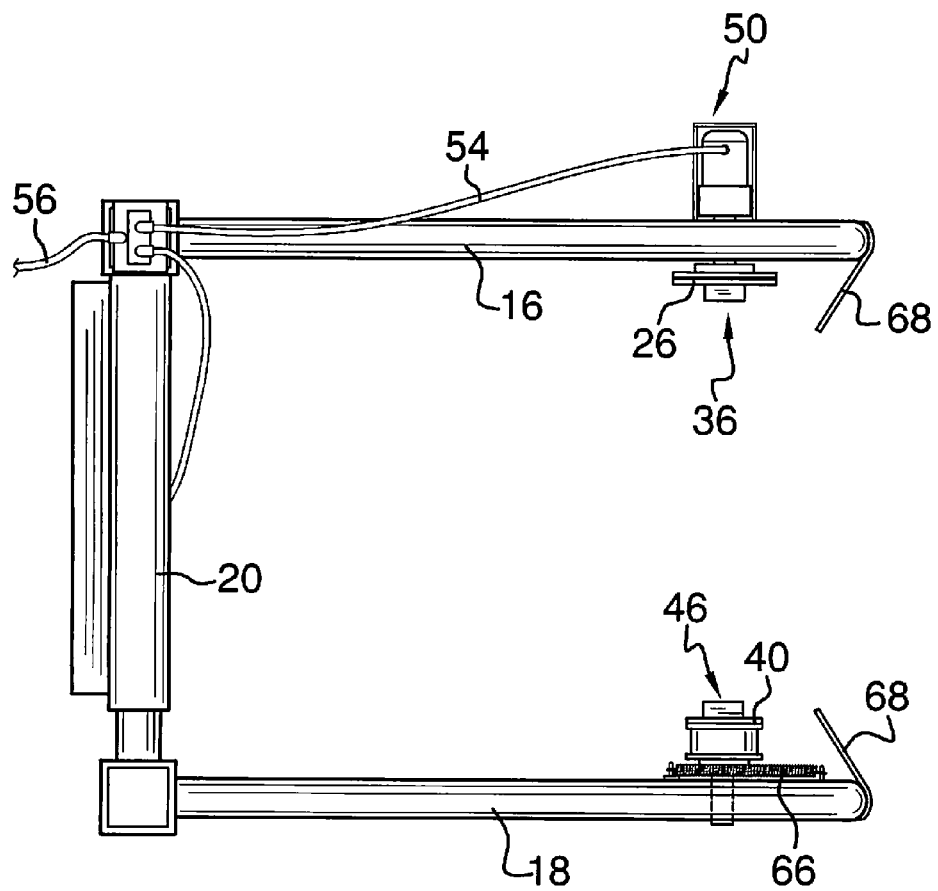
FIG. 7 is a top view of an embodiment of the disclosure.
Figure 8:
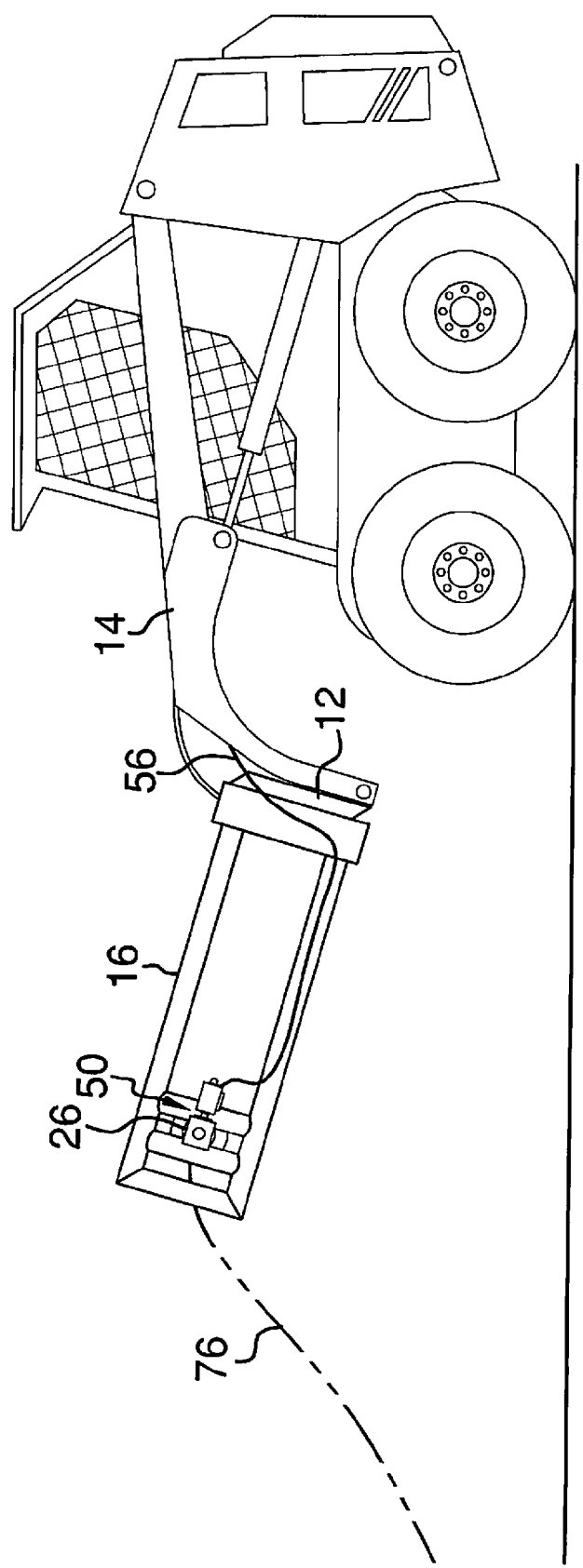
FIG. 8 is a side view of an embodiment of the disclosure in use.

With reference now to the drawings, and in particular to FIGS. 1 through 8 thereof, a new winding device embodying the principles and concepts of an embodiment of the disclosure and generally designated by the reference numeral 10 will be described.

As best illustrated in FIGS. 1 through 8, the weed barrier removal assembly 10 generally comprises a mounting plate 12 configured for coupling to a motorized vehicle 14 such as a skidsteer. A first arm 16 is coupled to and extends from the mounting plate 12. A second arm 18 is also coupled to and extends from the mounting plate 12. The second arm 18 is positioned in spaced relationship to the first arm 16. The first arm 16 may be positioned parallel to the second arm 18. A medial arm 20 may be coupled to the mounting plate 12 with the first arm 16 being coupled to and extending from a first end 22 of the medial arm 20. The second arm 18 is coupled to and extends from a second end 24 of the medial arm 20. The medial arm 20 may have an adjustable length wherein a space between the first arm 16 and the second arm 18 is adjustable. The first arm 16 and second arm 18 may each be formed by a plurality of bars 78. The bars 78 may be spaced and parallel. Crossbars 80 may be incorporated into the first arm 16 and second arm 18 to extend between the bars 78. The medial arm 20 may be formed by a telescopic central bar 82 with a locking pin 84 to hold the central bar 82 at a desired length. Telescopic guide bars 86 may be incorporated into the medial arm 20 and positioned above and below the central bar 82. Each guide bar 86 may comprise a sleeve 88 receiving a shaft 90.

A first coupler 26 is rotatably coupled to the first arm 16. The first coupler 26 is configured for coupling to an elongated member 28 such as a wooden board 30. The first coupler 26 may more specifically have a plate 32 and a perimeter wall 34 extending from the plate 32 defining a first receiver 36 configured for receiving a first end 38 of the elongated member 28. A second coupler 40 is rotatably coupled to the second arm 18 opposite the first coupler 26. The second coupler 40 is similarly configured for coupling to the elongated member 28 wherein the elongated member 28 extends between the first arm 16 and the second arm 18. The second coupler 40 may have a plate 42 and a perimeter wall 44 extending from the plate 42 of the second coupler 40 defining a second receiver 46 configured for receiving a second end 48 of the elongated member 28. The elongated member 28 may have a polygonal cross-sectional shape complimentary to the perimeter wall 34 of the first coupler 26 and the perimeter wall 44 of the second coupler 40 wherein the elongated member 28 rotates around a longitudinal axis of the elongated member 28 when the first coupler 26 is rotated. Each perimeter wall 34,44 may have a respective cutout 72 to facilitate attachment and securing of the elongated member 28.

A motivator 50 is operationally coupled to the first coupler 26 wherein the first coupler 26 is selectively rotated by activating the motivator 50. The motivator 50 may be a motor 52 coupled to the first arm 16 and operationally coupled to the first coupler 26 wherein the motor 52 rotates the first coupler 26. The motivator 50 may alternately be a hydraulic line 54 operationally coupled to the first coupler 26 to selectively rotate the first coupler 26. The hydraulic line 54 is configured for operationally coupling to a hydraulic system 56 of the motorized vehicle 14.

Rotation of the elongated member 28 may be limited to one direction. A ratchet wheel 74 is coupled to the second coupler 40. A pawl 58 has a first end 60 pivotally coupled to the second arm 18 and a second end 62 engaging the ratchet wheel 74 wherein the second coupler 40 is prevented from rotating reverse to a direction in which the motivator 50 rotates the first coupler 26. A biasing member 66 may be coupled to and extend between the second arm 18 and the pawl 58. The biasing member 66 urges the second end 62 of the pawl 58 into contact with the ratchet wheel 74.

A pair of diverting plates 68 may be provided. Each diverting plate 68 is coupled to a free end 70 of an associated one of the first arm 16 and the second arm 18. The diverting plates 68 are angled inwardly and backwardly towards the mounting plate 12.

In use, the mounting plate 12 is attached to the motorized vehicle 14. The first arm 16 and second arm 18 are spaced as desired to accommodate the elongated member 28 inserted into the first coupler 26 and the second coupler 40. A weed barrier 76 is attached to the elongated member 28. This may be accomplished by simple nails when using a board as the elongated member 28. The motorized vehicle 14 may then be positioned as desired and the motivator 50 activated to rotate the elongated member 28 wherein the weed barrier 76 is collected, diverted to pass between the first arm 16 and the second arm 18 by the diverting plates 68, and then wrapped around the elongated member 28.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure.

We claim:

1. A weed barrier removal assembly comprising:
   a mounting plate configured for coupling to a motorized vehicle;
   a first arm coupled to and extending from said mounting plate;
   a second arm coupled to and extending from said mounting plate, said second arm being positioned in spaced relationship to said first arm;
   a first coupler rotatably coupled to said first arm, said first coupler being configured for coupling to an elongated member;
   a second coupler rotatably coupled to said second arm opposite said first coupler, said second coupler being configured for coupling to the elongated member wherein the elongated member extends between said first and second arms;
   a motivator operationally coupled to said first coupler wherein said first coupler is selectively rotated by activating said motivator, said motivator being a motor coupled to said first arm, said motor being operationally coupled to said first coupler;
   a ratchet wheel coupled to said second coupler;
   a pawl having a first end pivotally coupled to said second arm and a second end engaging said ratchet wheel wherein said second coupler is prevented from rotating in a reverse direction from a direction in which said motivator rotates said first coupler.

2. The assembly of claim 1, further comprising a biasing member coupled to and extending between said second arm and said pawl, said biasing member urging said second end of said pawl into contact with said ratchet wheel.

3. The assembly of claim 1, further comprising said first coupler having a plate and a perimeter wall extending from said plate defining a first receiver configured for receiving a first end of an elongated member.

4. The assembly of claim 3, further comprising said second coupler having a plate and a perimeter wall extending from said plate of said second coupler defining a second receiver configured for receiving a second end of the elongated member.

5. The assembly of claim 1, further comprising said first arm being positioned parallel to said second arm.

6. The assembly of claim 1, further comprising:
   a medial arm coupled to said mounting plate;
   said first arm being coupled to and extending from a first end of said medial arm;
   said second arm being coupled to and extending from a second end of said medial arm; and
   said medial arm having an adjustable length wherein a space between said first arm and said second arm is adjustable.

7. The assembly of claim 1, further comprising said motivator being a hydraulic line operationally coupled to said first coupler, said hydraulic line being configured for operationally coupling to a hydraulic system of the motorized vehicle.

8. The assembly of claim 1, further including a pair of diverting plates, each diverting plate being coupled to a free end of an associated one of said first arm and said second arm, said diverting plates being angled inwardly and backwardly towards said mounting plate.

9. A weed barrier removal assembly comprising:
   a mounting plate configured for coupling to a motorized vehicle;
   a first arm coupled to and extending from said mounting plate;
   a second arm coupled to and extending from said mounting plate, said second arm being positioned in spaced relationship to said first arm, said first arm being positioned parallel to said second arm;
   a medial arm coupled to said mounting plate, said first arm being coupled to and extending from a first end of said medial arm, said second arm being coupled to and extending from a second end of said medial arm, said medial arm having an adjustable length wherein a space between said first arm and said second arm is adjustable;
   a first coupler rotatably coupled to said first arm, said first coupler being configured for coupling to an elongated member, said first coupler having a plate and a perimeter wall extending from said plate of said first coupler defining a first receiver configured for receiving a first end of the elongated member;
   a second coupler rotatably coupled to said second arm opposite said first coupler, said second coupler being configured for coupling to the elongated member wherein the elongated member extends between said first and second arms, said second coupler having a plate and a perimeter wall extending from said plate of said second coupler defining a second receiver configured for receiving a second end of the elongated member;
   a motivator operationally coupled to said first coupler wherein said first coupler is selectively rotated by activating said motivator;
   a ratchet wheel coupled to said second coupler;
   a pawl having a first end pivotally coupled to said second arm and a second end engaging said ratchet wheel wherein said second coupler is prevented from rotating in a reverse direction from a direction in which said motivator rotates said first coupler;

a biasing member coupled to and extending between said second arm and said pawl, said biasing member urging said second end of said pawl into contact with said ratchet wheel; and a pair of diverting plates, each diverting plate being coupled to a free end of an associated one of said first arm and said second arm, said diverting plates being angled inwardly and backwardly towards said mounting plate.

10. The assembly of claim 9, further comprising said motivator being a motor coupled to said first arm, said motor being operationally coupled to said first coupler.

11. The assembly of claim 9, further comprising said motivator being a hydraulic line operationally coupled to said first coupler, said hydraulic line being configured for operationally coupling to a hydraulic system of the motorized vehicle.

* * * * *